United States Patent [19]

Thiele et al.

[11] Patent Number: 5,235,027

[45] Date of Patent: Aug. 10, 1993

[54] MODIFIED COPOLYETHYLENE TEREPHTHALATE

[75] Inventors: Ulrich Thiele, Bruchkoebel; Heinz-Dieter Schumann, Maintal, both of Fed. Rep. of Germany

[73] Assignee: Zimmer Aktiengesellschaft, Frankfort, Fed. Rep. of Germany

[21] Appl. No.: 786,531

[22] Filed: Nov. 1, 1991

[30] Foreign Application Priority Data

Jul. 30, 1991 [DE] Fed. Rep. of Germany ....... 4125167

[51] Int. Cl.$^5$ .................. C08G 63/00; C08G 63/16; C08G 63/18; C08G 63/02
[52] U.S. Cl. .................. 528/308.2; 528/272; 528/308.1; 528/308.3
[58] Field of Search .................. 528/272, 308.1, 308.2, 528/308.3

[56] References Cited

U.S. PATENT DOCUMENTS

| | | | |
|---|---|---|---|
| 3,617,225 | 11/1971 | Kuehne | 422/135 |
| 3,900,527 | 8/1975 | King et al. | 528/302 |
| 4,058,507 | 11/1977 | Omoto et al. | 528/279 |
| 4,064,112 | 12/1977 | Rothe et al. | 528/272 |
| 4,133,801 | 1/1979 | Morimatsu et al. | 528/277 |
| 4,223,128 | 9/1980 | Halek et al. | 528/308.2 |
| 4,234,708 | 11/1980 | Edelman et al. | 528/305 |
| 4,745,174 | 5/1988 | Pruett et al. | 528/308.2 |

Primary Examiner—John Kight, III
Assistant Examiner—T. Mosley
Attorney, Agent, or Firm—Allegretti & Witcoff, Ltd.

[57] ABSTRACT

Modified copolyethylene terephthalate, for processing by extrusion blow molding, containing units of isophthalic acid, diethylene glycol and pentaerythritol, antimony and phosphorus plus small amounts of red toner and a blue toner. Also a process for producing same by direct esterification, melt polycondensation and heat treatment in the solid phase.

9 Claims, No Drawings

MODIFIED COPOLYETHYLENE TEREPHTHALATE

BACKGROUND OF THE INVENTION

This invention concerns a modified copolyethylene terephthalate suitable for processing by extrusion blow molding and a process for producing same.

THE PRIOR ART

Containers, especially beverage bottles, are produced by stretch blow molding or by extrusion blow molding. It is known that copolyethylene terephthalate containing isophthalic acid units and diethylene glycol units can be used for this purpose (European Patent B 41,035). However, such copolyesters are not very suitable for processing by extrusion blow molding because they do not have a sufficient melt strength.

A higher melt strength can be achieved by copolymerization with polyfunctional monomers, but this leads to a significant increase in the number of gels and specks. Therefore, copolyethylene terephthalates modified with isophthalic acid, a branching agent and a chain terminator have been proposed for extrusion blow molding (U.S. Pat. No. 4,234,708). The chain terminator counteracts the development of gels, but the effect depends greatly on the concentration. Unfortunately, this concentration can hardly be controlled in the usual polycondensation technology because the quantities of chain terminator lost as ethylene glycol ester with the polycondensation vapors fluctuate. Thus, a uniform polymer quality cannot be assured, especially with respect to the number of gels, the viscosity and the color.

It is also known that the whiteness of fiber-forming polyesters produced by ester exchange and polycondensation in the presence of a catalyst containing manganese and titanium can be improved by adding certain dibenzoisoquinolinedione toners (U.S. Pat. No. 4,745,174). However, the effect cannot be applied directly to other polycondensation systems for reasons that may have to do with the catalyst.

OBJECT OF THE INVENTION

The object of the present invention is to provide a polyester with a sufficient melt strength for processing by extrusion blow molding. The containers produced by this method should have a high brilliance and a neutral bluish white color with complete transparency and freedom from gels. In addition, these containers should be suitable for packaging and storage of foods, i.e., they should be organoleptically neutral.

DETAILED DESCRIPTION

The modified copolyethylene terephthalate according to this invention that has an intrinsic viscosity of 0.8 to 1.5 and contains, based on polyester,
0.5–5.0 wt % isophthalic acid units,
0.7–2.0 wt % diethylene glycol units,
300–2500 ppm tri- or tetrahydroxyalkane units,
80–150 ppm antimony,
phosphorus corresponding to a weight ratio of Sb:P of at least 4,
and a polyester soluble mixture of a red toner and a blue toner in a quantity ratio of 3:1 to 1:3, preferably 1:1, and in a total concentration not exceeding 5 ppm to adjust the Hunter color values measured on crystallized polyester granules in the range from $-2.5$ to $+2.0$ for the $a$ value and $+0.5$ to $-5.0$ for the $b$ value,
is suitable for producing such containers by extrusion blow molding.

The copolyester according to this invention is produced by direct esterification of terephthalic acid and 0.6–6.4% wt isophthalic acid with ethylene glycol and subsequent polycondensation, whereby the esterification is performed in the presence of, based on the sum of dicarboxylic acids,
0–1.5 wt % added diethylene glycol,
375–3200 ppm tri- or tetrahydroxyalkane,
100–190 ppm antimony in the form of an organic antimony compound,
and a polyester soluble mixture of a red toner and a blue toner in a quantity ratio of 3:1 to 1:3, preferably 1:1, and in a total concentration not exceeding 6.4 ppm to adjust the Hunter color values measured on the crystallized polyester granules in the range from $-2.5$ to $+2.0$ for the $a$ value and $+0.5$ to $-5.0$ for the $b$ value,
and a phosphorus-oxygen compound is added to the esterification mixture before polycondensation in an amount to correspond to an Sb:P weight ratio of at least 4, and the polycondensation product is subjected to a heat treatment in the solid phase after granulation.

The amount of components used corresponds to the amount calculated theoretically on the basis of the desired composition of the copolyester with the exception of ethylene glycol and diethylene glycol. Ethylene glycol is used in a molar ratio of 1.05 to 1.8, preferably 1.1 to 1.5, based on the sum of dicarboxylic acids. Diethylene glycol is formed by dehydration of ethylene glycol groups in the polymerization system, so the amount must simply be supplemented up to the desired content in the polymer. At a diethylene glycol content of up to about 1 wt % in the polymer, the addition of diethylene glycol is unnecessary whereas at 2.0%, for example, about 1.0% is added, based on the polymer. Diethylene glycol causes a reduction in melting point and crystallizing ability, and if the concentration is too high, it is associated with a loss of strength of the polyester. Therefore, the concentrations given must be observed exactly.

The tri-or tetrahydroxyalkanes include trimethylolethane, trimethylolpropane, glycerol and pentaerythritol. In principle, other polyhydroxyalkanes may be used. Pentaerythritol is preferred because it is practically nonvolatile in the polycondensation system and is advantageous with regard to the resulting polyester properties. It can be added at any time before completion of polycondensation but preferably during esterification. These polyhydroxy compounds essentially determine the melt strength and the other rheological properties of the polymer. The amount used must be limited carefully because otherwise gels or specks will be formed by crosslinking and in the extreme case nonthermoplastic properties are obtained.

Estofil blue S-GFP and Estofil red S-RBL from Sandoz are the preferred toners. Other toners with a similar absorption spectrum such as Xeres blue from Hoechst or Telasol blue from Sandoz can also be used, assuming they will not react or decompose during production and processing of the polyester. In addition, they must be neutral with respect to the products to be stored subsequently in the containers, and in the case of use with foods or beverages, they must be officially approved. Blue and red toner are used in a quantity ratio of 3:1 to 1:3, preferably 1:1, at a total concentration not exceeding 5 ppm, based on the polymer. The exact amount will depend on the toner mixture to be used and to a slight extent also on the copolyester. The concentration to be determined by preliminary testing is selected so the crystallized copolyethylene terephthalate granules will have a Hunter color value in the range of −2.5 to +2.0, preferably −1.5 to ±0.0 for the $a$ value, and +0.5 to −5.0, preferably −2.5 to −4.0 for the $\beta$ value.

An organic antimony compound is used as the catalyst. Antimony triacetate together with the two toners to be used leads to the best color properties of the copolyester. If the maximum amount of 150 ppm Sb in the polymer as claimed according to this invention is exceeded, the color may be improved but the homogeneity of the product, expressed in gels per unit of area, will suffer. Antimony glycolate and antimony tris(2-ethyl hexanoate) are equivalent but more expensive.

Phosphoric acid, phosphorous acid or esters thereof can be used as the phosphorusoxygen compound. It may be added at any time before polycondensation, in general toward the end of esterification or during the second phase of the esterification step. The phosphorus compound serves as stabilizer. The quantity used in relation to the antimony triacetate should be as low as possible because otherwise there is the danger of formation of metallic antimony, which will lead to discoloration of the polyester, or of precipitation of Sb-P compounds.

Esterification and polycondensation are carried out by known methods, preferably at 260°-290° C. and about 1 bar in the esterification step, 20–100 mbar in the first polycondensation step and less than 5 mbar in the last polycondensation step.

To produce containers by extrusion blow molding, the polymer must have a relatively high intrinsic viscosity of at least 0.8. This high intrinsic viscosity can be achieved by crystallization and post-condensation in the solid phase at 180°-230° C. in vacuo or under an inert gas, preferably nitrogen, for a period of 5–20 hours starting from a granular precondensate with an intrinsic viscosity of about 0.6–0.7. A suitable process is described, for example, in U.S. Pat. No. 4,064,112. The modified copolyethylene terephthalate produced in this way has an acetaldehyde content of less than 1.0 ppm, preferably less than 0.6 ppm, with minimal reformation of acetaldehyde and is therefore excellently suited for packaging foods, especially those products with a high organoleptic sensitivity such as bottles for noncarbonated mineral water.

Melt polycondensation can also be continued up to the desired final intrinsic viscosity, in which case the last step is preferably carried out in a thin-film reactor as described, for example, in U.S. Pat. No. 3,617,225. Next the polymer is converted to granules in regular form with a particle weight of less than 15 mg and aldehyde is removed from the granules at 150°-180° C. in a gas stream of dry air or inert gas for 5–20 hours. The resulting modified copolyethylene terephthalate has an acetaldehyde content of less than 2.0 ppm, preferably less than 1.0 ppm, but this concentration is completely adequate for most applications.

SPECIFIC EXAMPLES

The following examples support this invention without restricting it in any way. The properties of the copolyester were determined by the following methods.

Intrinsic viscosity

Dissolve approximately 125 mg polyester in 25 mL of a mixture of phenol and 1,2-dichlorobenzene (3:2) and determine the viscosity of this solution at 25° C. according to Ubbelohde. Then use the resulting relative viscosity to calculate the intrinsic viscosity in dl/g according to Billmeyer.

Melt strength

Melt the dried polymer in a small extruder and force through a vertical nozzle (diameter 2.5 mm, length 6.35 mm) in air at the rate of 132 g/h with the help of a gear pump. The temperature of the melt at the nozzle outlet is 20 K. above the DSC melting point of the polymer and the shear rate is 20 sec$^{-1}$. Cut off the strand at the bottom of the nozzle at the time t=0. After the melt strand has dropped a distance of 76.2 mm, measure the time $t_1$ and then after 76.2 mm more measure the time $t_1+t_2$. Calculate the melt strength (MS) as the average of 10 measurements according to the formula $$MS = t_1/t_2$$

Diethylene glycol content

Subject approximately 1 g polyester to complete ester exchange in a Carius tube with 30 mL methanol in the presence of 50 mg/L zinc acetate at 200° C. and then determine the diethylene glycol in the reaction mixture by gas chromatography.

Acetaldehyde content

Grind polymer under liquid nitrogen (0.25–0.75 mm fraction) and place 7 g in a 300 mL flask with a membrane seal. Purge with nitrogen for 5 minutes (200 L/h), and then suspend the sealed flask in an oil bath at 150° C. for 90 minutes. Immediately thereafter, determine the acetaldehyde content by gas chromatography by head space analysis of the resulting acetaldehyde-nitrogen mixture.

a and b color values

Measure these values on polyester granules crystallized for 1 hour at 150° C. in a drying oven. Determine the a and b color values by measuring the color of the polyester sample with a three-range colorimeter with three photo cells, one of each of which has a red, green and blue filter, respectively, in front of it. Perform the analysis according to Hunter. Tristimulus colorimeters giving direct readouts of Yellowness Index are: XL-10A Colorimeter with Yellowness Index Option, manufactured by Gardner Laboratory, Inc., Bethesda, Md. 20014 and Hunterlab D25P Sphere Haze and Color Difference Meter with Yellowness Index option, manufactured by Hunter Associates Laboratory, Fairfax, Va. 22030 (footnote 6 of related ASTM D 1925-70, reapproved 1988, "Standard Test Method For Yellowness Index of Plastics").

Number of gels

Produce smooth-walled bottles with a capacity of at least 500 mL by extrusion blow molding of the crystallized, dried polyester granules. Cut wall pieces of 3×5 cm from 10 bottles and count all clearly discernible gels that can be seen with the naked eye.

EXAMPLE 1

A reaction mixture of
191.6 kg terephthalic acid
8.4 kg isophthalic acid
85.0 kg ethylene glycol
2.6 kg diethylene glycol (DEG)
700 ppm pentaerythritol
120 ppm antimony as antimony triacetate
1.5 ppm Estofil red S-RBL
1.5 ppm Estofil blue S-GFP
was esterified at 1 bar and an average temperature of 275° C., then mixed with 25 ppm phosphorus as phosphoric acid and subjected to polycondensation in two steps, first at 50 mbar and 273° C. and then at 1 mbar and 276° C. up to intrinsic viscosity of 0.65. The granulated polycondensate was then subjected to crystallization and post-condensation in the solid phase for 1 hour at 160° C. plus 7 hours at 210° C. The product had the following properties:

| Intrinsic viscosity: | 0.85 |
| --- | --- |
| Melt strength: | 2.83 |
| DEG content: | 1.65 wt % |
| Acetaldehyde content: | 0.8 ppm |
| a color value: | −1.3 |
| b color value: | −2.5 |
| Number of gels per 10 cm$^2$: | 0 to 1 |

Without the addition of pentaerythritol, the melt strength of the copolyester would be about 3.8.

EXAMPLE 2

Example 1 is repeated but with 250 ppm antimony. The copolyester had the following properties:

| Intrinsic viscosity: | 0.89 |
| --- | --- |
| Melt strength: | 2.85 |
| DEG content: | 1.70 wt % |
| Acetaldehyde content: | 0.8 ppm |
| a color value: | −1.6 |
| b color value: | −2.0 |
| Number of gels per 10 cm$^2$: | 2 to 3 |

EXAMPLE 3

Example 1 was repeated but using 2800 ppm pentaerythritol and omitting the addition of Estofil red and Estofil blue. The copolyester then had the following properties:

| Intrinsic viscosity: | 0.98 |
| --- | --- |
| Melt strength: | 1.60 |
| DEG content: | 1.65 wt % |
| Acetaldehyde content: | 0.7 ppm |
| a color value: | −2.3 |
| b color value: | +3.0 |
| Number of gels per 10 cm$^2$: | 3 to 5 |

EXAMPLE 4

Example 1 was repeated but using 1500 ppm pentaerythritol. Furthermore, polycondensation was continued in the melt phase until reaching an intrinsic viscosity of 0.88. Granules were produced from the polycondensate with a particle weight of 12 mg and then treated in air at 150° to 170° C. for 12 hours to remove aldehyde. The copolyester had the following properties:

| Intrinsic viscosity: | 0.89 |
| --- | --- |
| Melt strength: | 2.31 |
| DEG content: | 1.80 wt % |
| Acetaldehyde content: | 0.9 ppm |
| a color value: | −1.5 |
| b color value: | −2.5 |
| Number of gels per 10 cm$^2$: | 0 to 1 |

As shown by the preceding examples, the desired combination of properties of the modified copolyethylene terephthalate is achieved only when all the parameters according to this invention, i.e., the concentrations and components as well as the procedures, are observed.

We claim:

1. Modified copolyethylene terephthalate for processing by extrusion blow molding, said terephthalate having an intrinsic viscosity of 0.8 to 1.5 dl/g measured at 25° C. on a solution of 125 mg polyester in 25 ml of a mixture of phenol and 1,2-dichlorobenzene (3:2) characterized in that the copolyethylene terephthalate is completely transparent, and contains, based on the polyester, 0.5–5.0 wt % isophthalic acid units,
0.7–2.0 wt % diethylene glycol units,
300–2500 ppm tri- or tetrahydroxyalkane units,
80–150 ppm antimony,
phosphorus corresponding to an Sb:P weight ratio of at least 4,
and a polyester soluble mixture of a red toner and a blue toner in a quantity ratio of 3:1 to 1:3, and in a total concentration not exceeding 5 ppm to adjust the color of said copolyethylene terephthalate expressed as Hunter color values measured on the crystalline polyester granules to a range of −2.5 to +2.0 for the a value and +0.5 to −5.0 for the b value, the balance being ethylene terephthalate units to total 100 wt %.

2. Modified copolyethylene terephthalate according to claim 1, characterized in that the Hunter color values are in a range of −1.5 to +0.0 for the value a and −2.5 to −4.0 for the b value.

3. Modified copolyethylene terephthalate according to claim 1, characterized in that it has an acetaldehyde content of less than 1.0 ppm.

4. A container made by extrusion blow molding a modified copolyethylene terephthalate according to claim 1.

5. A container made by extrusion blow molding a modified copolyethylene terephthalate according to claim 3.

6. Process for producing the modified copolyethylene terephthalate according to claim 1 by direct esterification of a mixture of terephthalic acid and 0.6–6.4% wt isophthalic acid with ethylene glycol and subsequent polycondensation, comprising 7. Process according to claim 6, wherein polycondensation is stopped at an intrinsic viscosity of about 0.6–0.7 dl/g measured at 25° C. on a solution of 125 mg polyester in 25 ml of a mixture of phenol and 1,2-dichlorobenzene (3:2) and the heat treatment consists of crystallization and post-condensation of the granules at 180°–230° C. under an inert gas or in vacuo up to an intrinsic viscosity of 0.8–1.5 dl/g.

8. Process according to claim 6, wherein polycondensation is stopped at an intrinsic viscosity of 0.8–1.5 and the heat treatment consists of dealdehydization of the granules at 150°–180° C. in a gas stream of dry air or inert gas, the granules having a particle weight of less than 15 mg.

9. Modified copolyethylene terephthalate according to claim 1 wherein the quantity ratio of said red toner to said blue toner is 1:1.

* * * * *

UNITED STATES PATENT AND TRADEMARK OFFICE
CERTIFICATE OF CORRECTION

PATENT NO. : 5,235,027
DATED : Aug. 10, 1993
INVENTOR(S) : Ulrich Thiele, et al

It is certified that error appears in the above-indentified patent and that said Letters Patent is hereby corrected as shown below:

6. Process for producing the modified copolyethylene terephthalate according to Claim 1 by direct esterification of a mixture of terephthalic acid and 0.6-6.4% wt isophthalic acid with ethylene glycol and subsequent polycondensation, comprising (a) esterifying the acids with the glycol in the presence of, based on the sum of dicarboxylic acids, 0-1.5 wt% added diethylene glycol, 375-3200 ppm tri- or tetrahydroxyalkane, 100-190 ppm antimony in the form of an organic antimony compound, and a polyester soluble mixture of a red toner and a blue toner in a quantity ratio of 3:1 to 1:3, and in a total concentration not exceeding 6.4 ppm to adjust the Hunter color values measured on the crystalline polyester granules to a range of -2.5 to +2.0 for the $a$ value and +0.5 to -5.0 for the $b$ value,

UNITED STATES PATENT AND TRADEMARK OFFICE
CERTIFICATE OF CORRECTION

PATENT NO. : 5,235,027
DATED : Aug. 10, 1993
INVENTOR(S) : Ulrich Thiele, et al

It is certified that error appears in the above-indentified patent and that said Letters Patent is hereby corrected as shown below:

(b) adding to the esterification mixture before polycondensation a phosphorus-oxygen compound corresponding to an Sb:P weight ratio of at least 4, (c) granulating the polycondensation product, and (d) heat treating the polycondensation granules.

Signed and Sealed this

Twenty-second Day of March, 1994

Attest:

BRUCE LEHMAN

Attesting Officer  Commissioner of Patents and Trademarks